US012493318B1

(12) United States Patent
Shen et al.

(10) Patent No.: US 12,493,318 B1
(45) Date of Patent: Dec. 9, 2025

(54) CLOCK GATING FOR SCAN SHIFT CLOCK IN A MESH CLOCK ENVIRONMENT

(71) Applicant: Marvell Asia Pte Ltd, Singapore (SG)

(72) Inventors: Shunquan Shen, Acton, MA (US); Zahi S. Abuhamdeh, Billerica, MA (US); Arun Hegde, Acton, MA (US); Samuel Rodriguez, Northborough, MA (US)

(73) Assignee: MARVELL ASIA PTE LTD, Singapore (SG)

( * ) Notice: Subject to any disclaimer, the term of this patent is extended or adjusted under 35 U.S.C. 154(b) by 97 days.

(21) Appl. No.: 18/524,182

(22) Filed: Nov. 30, 2023

Related U.S. Application Data

(60) Provisional application No. 63/442,440, filed on Jan. 31, 2023.

(51) Int. Cl.
*G06F 1/10* (2006.01)
*G06F 30/396* (2020.01)

(52) U.S. Cl.
CPC .............. *G06F 1/10* (2013.01); *G06F 30/396* (2020.01)

(58) Field of Classification Search
CPC ....................................................... G06F 1/10
See application file for complete search history.

(56) References Cited

U.S. PATENT DOCUMENTS

| | | | |
|---|---|---|---|
| 2002/0147951 A1* | 10/2002 | Nadeau-Dostie | G01R 31/318552 714/731 |
| 2007/0288818 A1* | 12/2007 | Wang | G01R 31/31858 714/726 |
| 2023/0251310 A1* | 8/2023 | Krishnamoorthy | G06F 1/06 714/34 |
| 2024/0353489 A1* | 10/2024 | Li | G01R 31/318594 |

* cited by examiner

*Primary Examiner* — Phil K Nguyen (57) ABSTRACT

Clock distribution circuitry, for distributing clocks for scan operations in an integrated circuit device in which a mission mode clock is distributed by a mesh clock structure and a scan fabric clock is distributed by a scan clock bus, includes a mesh clock source, and a local distribution structure for distributing the clocks for scan operations to a local clock domain that includes a subset of taps of the mesh clock structure. The local distribution structure includes a local controller for controlling derivation of a scan capture clock from the mesh clock source, local scan host circuitry for deriving a local scan shift clock from the scan fabric clock, and specialized integrated clock gates corresponding in number to the subset of taps of the mesh clock structure, for selecting between the scan capture clock in a scan capture mode, and the local scan shift clock in a scan shift mode.

21 Claims, 6 Drawing Sheets

CLOCK GATING FOR SCAN SHIFT CLOCK IN A MESH CLOCK ENVIRONMENT

CROSS REFERENCE TO RELATED APPLICATION

This disclosure claims the benefit of, commonly-assigned U.S. Provisional Patent Application No. 63/442,440, filed Jan. 31, 2023, which is hereby incorporated by reference herein in its entirety.

FIELD OF USE

This disclosure relates to clocking of a packetized scan chain testing fabric. More particularly, this disclosure relates to balancing clock distribution in a packetized scan chain testing fabric in a device in which clocks are distributed by a mesh clock network.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Integrated circuit devices may be tested after fabrication, both to determine whether the circuit design functions as intended, and to detect any fabrication errors that may have occurred, by applying to the device a known signal stream—referred to as a scan chain—and observing resulting intermediate and/or output signals. In a packetized scan fabric, packets that contain scan data are delivered through a streaming bus. The scan streaming bus is routed through each block of the integrated circuit device. Scan clocks, scan enable signals, and scan compression controls are generated independently at the block level. This technique improves the efficiency of the scan data utility, enables a scan input/output (I/O) speeds faster than the scan shift speed, and helps to reduce power consumption.

At the same time, it has become common to distribute clocks on large integrated circuit devices using mesh clock techniques, in which multiple synchronized clock drivers apply the same clock signal at multiple points on a clock conducting grid, lowering latency and skew, and increasing on-chip variation (OCV) tolerance. However, it is challenging to implement a packetized scan fabric in a mesh clock environment and close timing while minimizing clock skew.

SUMMARY

In accordance with implementations of the subject matter of this disclosure, clock distribution circuitry, for distributing clocks for scan operations in an integrated circuit device in which a mission mode clock is distributed by a mesh clock structure and a scan fabric clock is distributed by a scan clock bus, includes a mesh clock source, and at least one local clock distribution structure configured to distribute the clocks for scan operations to a local clock domain that includes at least a subset of taps of the mesh clock structure. The local clock distribution structure includes a local clock controller configured to control derivation of a scan capture clock from the mesh clock source, local scan host circuitry configured to derive a local scan shift clock from the scan fabric clock, and a plurality of specialized integrated clock gates corresponding in number to the subset of taps of the mesh clock structure, each specialized integrated clock gate within the plurality of specialized integrated clock gates being configured to select between the scan capture clock when the integrated circuit device is operating in a scan capture mode, and the local scan shift clock when the integrated circuit device is operating in a scan shift mode, for delivery to a tap within the subset of taps of the mesh clock structure.

In a first implementation of such clock distribution circuitry, the at least one local clock distribution structure configured to distribute the clocks for scan operations to a local clock domain that includes at least a subset of taps of the mesh clock structure may include a plurality of local clock distribution structures, and each respective local clock distribution structure in the plurality of local clock distribution structures may be configured to distribute the clocks for scan operations to a respective local clock domain that includes a respective subset of taps of the mesh clock structure.

In a second implementation of such clock distribution circuitry, the local clock controller may be configured to derive a capture clock enable signal from output of the mesh clock source, and each specialized integrated clock gate within the plurality of specialized integrated clock gates may include integrated clock gating circuitry configured to output the scan capture clock based on the capture clock enable signal and the output of the mesh clock source.

In a third implementation of such clock distribution circuitry, each specialized integrated clock gate within the plurality of specialized integrated clock gates may include a selection circuit configured to select between the scan capture clock and the local scan shift clock for delivery to the respective tap within the subset of taps of the mesh clock structure.

According to a first aspect of that third implementation, the selection circuit may include a multiplexer having a control input configured to control selection between the scan capture clock and the local scan shift clock for delivery to the respective tap within the subset of taps of the mesh clock structure.

According to a second aspect of that third implementation, the selection circuit may include an OR-gate having a first input coupled to the scan capture clock, a second input coupled to the local scan shift clock, and an output coupled to the respective tap within the subset of taps of the mesh clock structure.

In a first instance of that second aspect, the first input of the OR-gate may be selectably coupled to ground for selecting the local scan shift clock, and the second input of the OR-gate may be selectably coupled to ground for selecting the scan capture clock.

In a fourth implementation of such clock distribution circuitry, the mesh clock source may include clock control circuitry and at least one input clock source.

According to a first aspect of that fourth implementation, the at least one input clock source may include a phase-locked loop for deriving an at-speed capture clock.

According to a second aspect of that fourth implementation, the at least one input clock source may include a general-purpose input/output clock of the integrated circuit device for use as a stuck-at capture clock.

According to a third aspect of that fourth implementation, the at least one input clock source may include an input for an external shift capture clock from another local clock domain of the integrated circuit device.

In a fifth implementation of such clock distribution circuitry, the local clock distribution structure may further include a balanced clock tree for distribution of the local scan shift clock to each specialized integrated clock gate in the plurality of specialized integrated clock gates.

In accordance with implementations of the subject matter of this disclosure, a clock distribution method, for distributing clocks for scan operations in an integrated circuit device in which a mission mode clock is distributed by a mesh clock structure and a scan fabric clock is distributed by a scan clock bus, includes distributing the clocks for scan operations to at least one local clock domain that includes at least a subset of taps of the mesh clock structure. The distributing includes deriving a scan capture clock from a mesh clock source, deriving a local scan shift clock from the scan fabric clock, and selecting between the scan capture clock when the integrated circuit is operating in a scan capture mode, and the local scan shift clock when the integrated circuit is operating in a scan shift mode, for delivery to a tap within the subset of taps of the mesh clock structure.

In a first implementation of such a clock distribution method, distributing the clocks for scan operations to at least one local clock domain may include distributing the clocks for scan operations to a plurality of local clock domains, each local clock domain including a respective subset of taps of the mesh clock structure.

In a second implementation of such a clock distribution method, deriving of a scan capture clock from a mesh clock source may include deriving a capture clock enable signal from output of the mesh clock source, and outputting the scan capture clock based on the capture clock enable signal and the output of the mesh clock source.

In a third implementation of such a clock distribution method, selecting between the scan capture clock and the local scan shift clock for delivery to a tap within the subset of taps of the mesh clock structure the selection circuit may include controlling a multiplexer control input to control selection between the scan capture clock and the local scan shift clock for delivery to the respective tap within the subset of taps of the mesh clock structure.

In a fourth implementation of such a clock distribution method, selecting between the scan capture clock and the local scan shift clock for delivery to a tap within the subset of taps of the mesh clock structure the selection circuit may include coupling a first input of an OR-gate to the scan capture clock, coupling a second input of the OR-gate to the local scan shift clock, and coupling an output of the OR-gate to the respective tap within the subset of taps of the mesh clock structure.

A first aspect of that fourth implementation may further include selectably coupling the first input of the OR-gate to ground for selecting the local scan shift clock, and selectably coupling the second input of the OR-gate to ground for selecting the scan capture clock.

In a fifth implementation of such a clock distribution method, deriving the scan capture clock from the mesh clock source may include deriving an at-speed capture clock from a phase-locked loop.

In a sixth implementation of such a clock distribution method, deriving the scan capture clock from the mesh clock source may include inputting a general-purpose input/output of the integrated circuit device to the mesh clock source for use as a stuck-at capture clock.

In a seventh implementation of such a clock distribution method, deriving the scan capture clock from the mesh clock source may include inputting an external shift capture clock from another local clock domain of the integrated circuit device to the mesh clock source for use as the scan capture clock.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As noted above, integrated circuit devices may be tested after fabrication, both to determine whether the circuit design functions as intended, and to detect any fabrication errors that may have occurred, by applying to the device a known signal stream—referred to as a scan chain—and observing resulting intermediate and/or output signals. In a packetized scan fabric, packets that contain 100% scan data are delivered through a streaming bus. The scan streaming bus is routed through each block of the integrated circuit device. Scan clocks, scan enable signals, and scan compression controls are generated independently at the block level. This technique improves the efficiency of the scan data utility, enables a scan I/O speed faster than the scan shift speed, and helps to reduce power consumption.

At the same time, it has become common to distribute clocks on large integrated circuit devices using mesh clock techniques, in which multiple synchronized clock drivers apply the same clock signal at multiple points on a clock conducting grid, lowering latency and skew, and increasing OCV tolerance. However, in a mesh clock environment, it is difficult to implement a packetized scan fabric and to close timing while minimizing clock skew.

Specifically, a packetized scan fabric requires a locally generated scan shift clock for shifting the scan data through each block. While there is an at-speed capture mode for monitoring the scan data as it changes, there also is a stuck-at capture mode (which tests for gates that are "stuck" in one state or another because of, e.g., manufacturing defects) that requires a separate stuck-at capture clock. A typical on-chip clock controller (OCC) injects both a scan shift clock and a stuck-at capture clock into the mesh clock domain. However, the mesh clock network is balanced to close "mission mode" (i.e., run mode) hold timing, and because the scan shift clock and stuck-at capture clock are not balanced to the mesh clock tap points (i.e., to the locations at which the mesh clock drivers are applied to the clock grid), closure of timing for the mission mode clock does not close the scan shift clock or stuck-at capture clock hold timing. In addition, it may be difficult to balance the scan shift clock or the stuck-at capture clock to the mesh clock tap points without impacting the mission mode setup and hold timing, even if one were to try.

Moreover, the locally generated scan shift clocks are asynchronous to the global mesh clock, and usually are much slower, so establishing a parent-child relationship between a global mesh clock OCC and any of the local scan shift clock OCCs also is difficult. While some parent-child OCC arrangements are available in which a locally generated scan shift clock is synchronized into a clock enable signal in a mesh clock domain, and that clock enable signal is then used to gate the mesh clock for scan shifting, those arrangements result in a narrow clock shift pulse, and they also limit the frequency ratio between the mesh clock and scan shift clock. Such arrangements also require special consideration in the scan insertion flow to handle shift timing between the mesh clock domain and the scan compression logic/non-mesh clock domain.

Therefore, in accordance with implementations of the subject matter of this disclosure, the clock path used for the capture clocks (e.g., the stuck-at capture clock and the at-speed capture clock) is different from the clock path used for the scan shift clock. The clock path used for the capture clocks may be the mission mode clock path without alteration, so that there is no effect on timing closure for the mission mode clock. A separate clock path is used for the scan shift clock. A specialized integrated clock gating cell is provided in accordance with implementations of the subject matter of this disclosure to select between the scan chain clock path and the clock path used by the capture clocks and the mission mode clock.

The specialized integrated clock gating cell may include a standard integrated clock gating cell and a selection element. The clock path used by the capture clock and the mission mode clock is input to the standard integrated clock gating cell, whose output is coupled to one input of the selection element. The scan chain clock path is coupled to another input of the selection element. The selection element may be an OR-gate or a multiplexer, as described in more detail below.

As noted, the capture clock uses the mission mode clock path, but the scan shift clock does not, so the scan shift mode hold timing closure has no impact on mission mode timing closure. The specialized integrated clock gating cell may be replicated at every mesh clock tap point. Pipeline logic may be placed between the on-chip clock controller and the specialized integrated clock gating cell to meet clock enable timing. A clock tree may be provided to deliver the scan shift clock from the scan fabric host, where the scan shift clock is generated, to the specialized integrated clock gating cells. The clock tree may be created using standard clock tree synthesis techniques and may include buffering to deliver clock signals with acceptable skew. Hold delays may be added to the scan inputs of scan-chain flip-flops to mitigate scan chain hold violations.

As noted above, the specialized integrated clock gating cell may include a standard integrated clock gating cell and a selection element which may be an OR-gate or a multiplexer. In mission mode, the mission mode clock is input to the standard integrated clock gating cell which is transparent to the mission mode clock. In an OR-gate embodiment in mission mode, the scan clock input to the OR-gate is gated off (i.e., forced to '0'), and an enable input of the standard integrated clock gating cell is asserted high (i.e., forced to '1') so that the mission mode clock passes directly through the OR-gate. In a multiplexer embodiment in mission mode, the enable input of the standard integrated clock gating cell is asserted high, and a multiplexer selection signal is used to select the output of the standard integrated clock gating cell, so that the mission mode clock is passed, although the multiplexer may introduce some clock insertion delay.

In scan modes, in a multiplexer embodiment, the selection signal may be used to select either the scan shift clock during scan chain shifting, or the standard integrated clock gating cell output to use the mission mode clock during scan capture (whether at-speed capture or stuck-at capture). In an OR-gate embodiment in scan chain shifting mode, the standard integrated clock gating cell input of the OR-gate would be gated off to select the scan shift clock input, so that the capture clock is forced to be low, allowing the toggling or pulsing scan shift clock on the other input of the OR-gate to be passed. In an OR-gate embodiment in scan capture mode, and the scan shift clock input would be gated off during scan capture (whether at-speed capture or stuck-at capture), allowing the toggling or pulsing capture clock on the other input of the OR-gate to be passed. Therefore, the OR-gate acts as a selector.

The subject matter of this disclosure may be better understood by reference to FIGS. 1-7.

Figure 1:
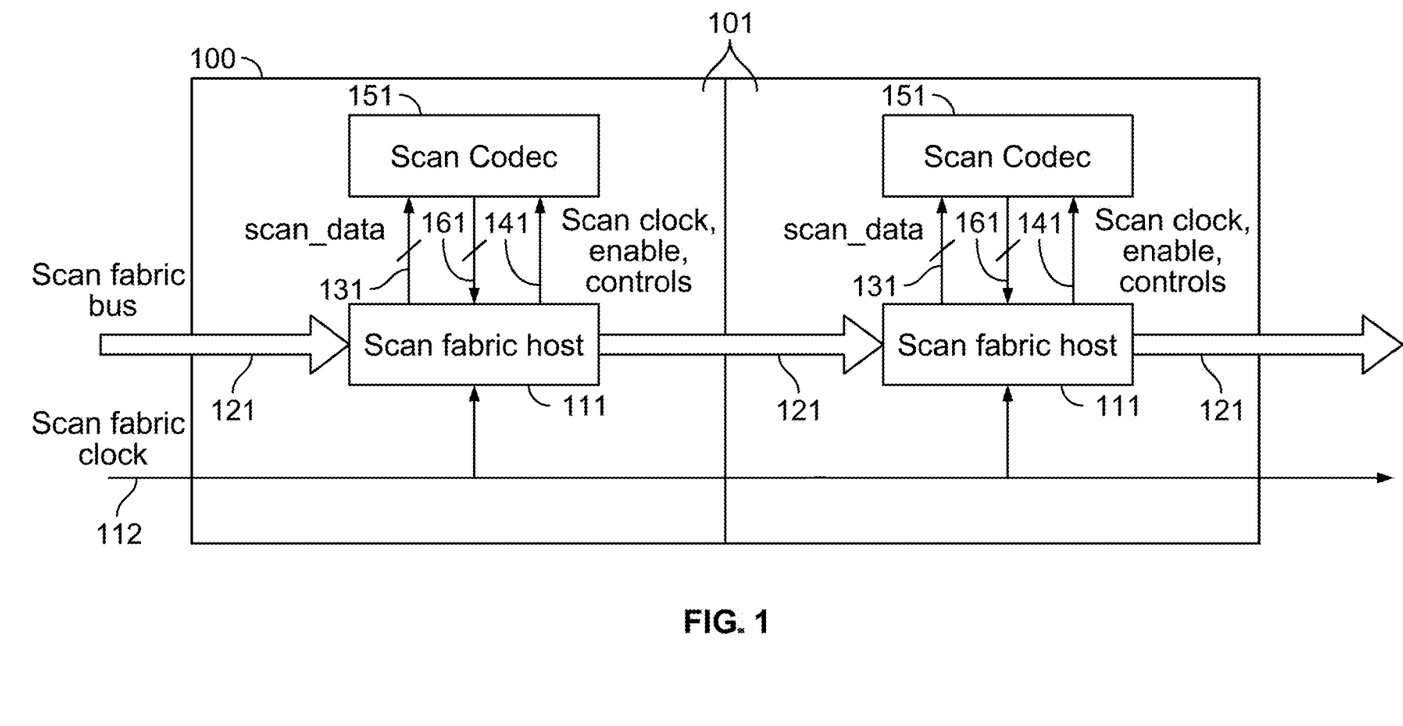
FIG. 1 shows a packetized scan fabric that can be operated in a mesh clock environment using implementations of the subject matter of this disclosure.

On an integrated circuit device (not shown in FIG. 1), in a packetized scan fabric 100 with which implementations of the subject matter of this disclosure may be used, of which two blocks 101 are shown in FIG. 1, each block 101 includes a scan fabric host 111 serviced by a scan fabric bus 121. Scan fabric bus 121 traverses all scan fabric blocks 101, delivering scan chain data and returning scan capture data. The packetized scan fabric 100 is clocked by its own scan fabric clock 112, which is delivered to each scan fabric host 111 by a scan clock bus. Each scan fabric host 111 propagates scan chain data 131, along with control signals 141 (including clocks, enable signals, etc.), to respective scan codec 151 which controls the propagation of scan chain data 131 through the respective logic of each respective scan fabric block 101 and returns scan capture data 161. The scan capture data 161 is returned via scan fabric bus 121 for analysis, either elsewhere on the integrated circuit device, or in an external device separate from the integrated circuit device.

Figure 2:
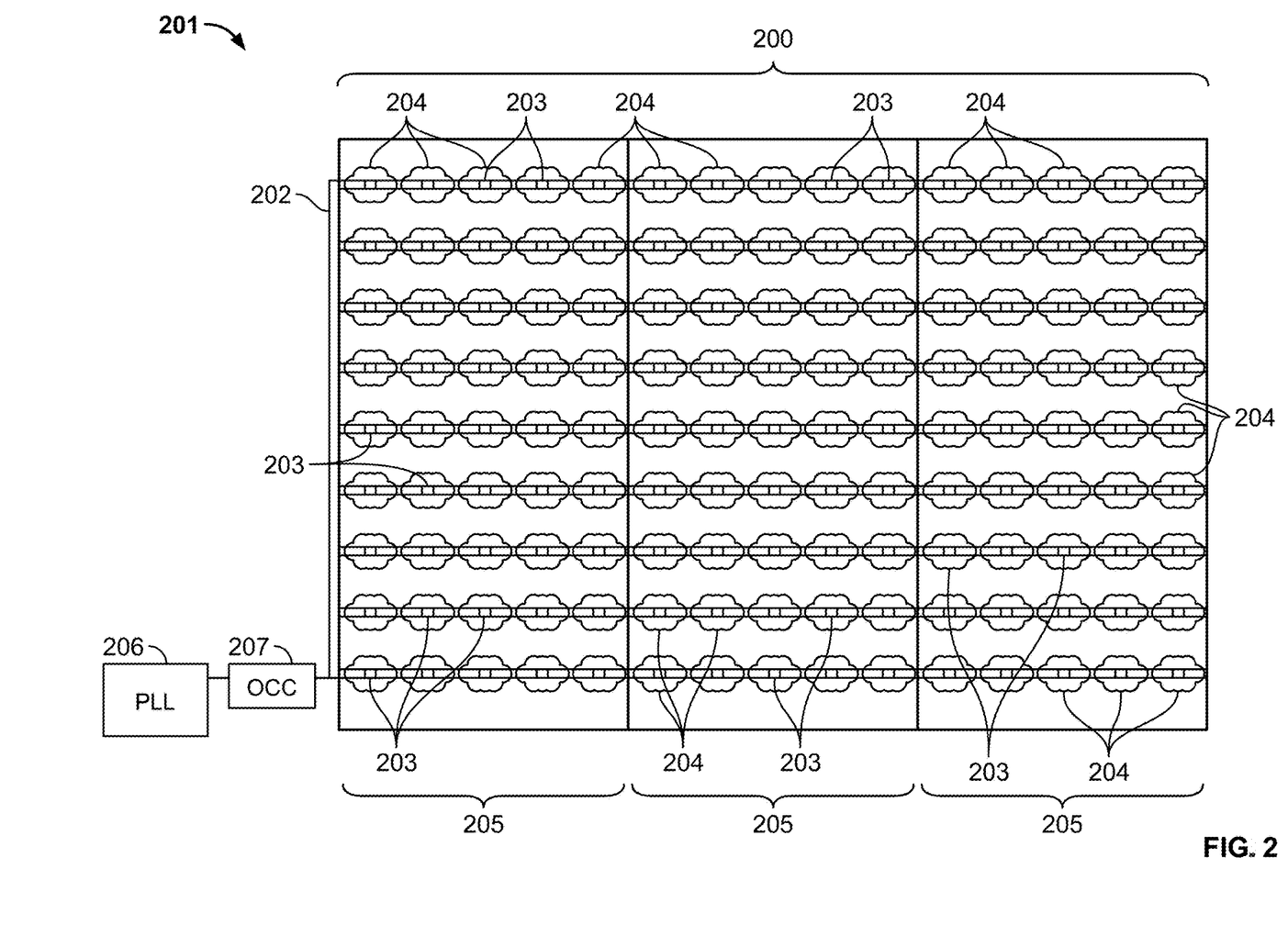
FIG. 2 is a first representation of a mesh clock environment in which a packetized scan fabric can be implemented.

Although scan fabric 100 may be incorporated into any type of integrated circuit device, the subject matter of this disclosure relates to incorporation of scan fabric 100 into an integrated circuit device 201 having a mesh clock distribution structure 200. Mesh clock distribution structure 200 includes a clock distribution grid 202 into which a clock signal is injected by a plurality of clock drivers (not shown) that are synchronized using a clock tree structure (not shown). The clock signal is provided to individual clock domains 204 from tap points 203 via integrated clock gating cells (described below). An integrated circuit device 201 may be divided into a plurality (e.g., three shown) of blocks 205, each incorporating a subset of the total number of clock domains 204 on the integrated circuit device 201. The clock signal 217 is derived from a phase-locked loop (PLL) 206 servicing the entire mesh clock distribution structure 200 under the control of a "parent" on-chip clock controller (OCC) 207.

Figure 3:
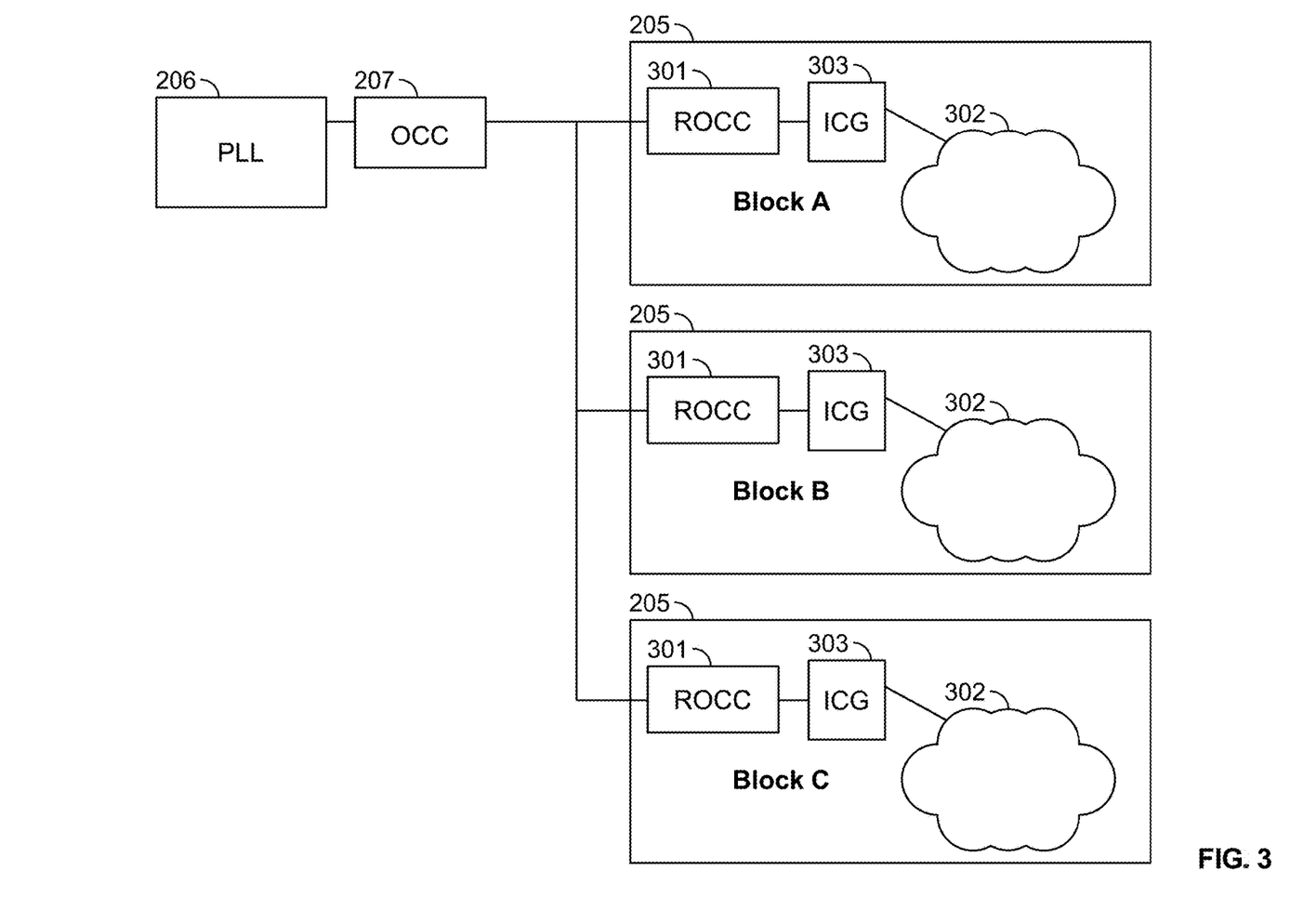
FIG. 3 is a simplified representation of the mesh clock environment of FIG. 2.

As shown in FIG. 3, each block 205 may have its own "remote" OCC (ROCC) 301 serving the collected group 302 of clock domains 204 in the respective block 205 through a group 303 of specialized integrated clock gating cells 402 (described below), with each specialized integrated clock gating cell within group 303 servicing an individual mesh clock tap point 203.

Figure 4:
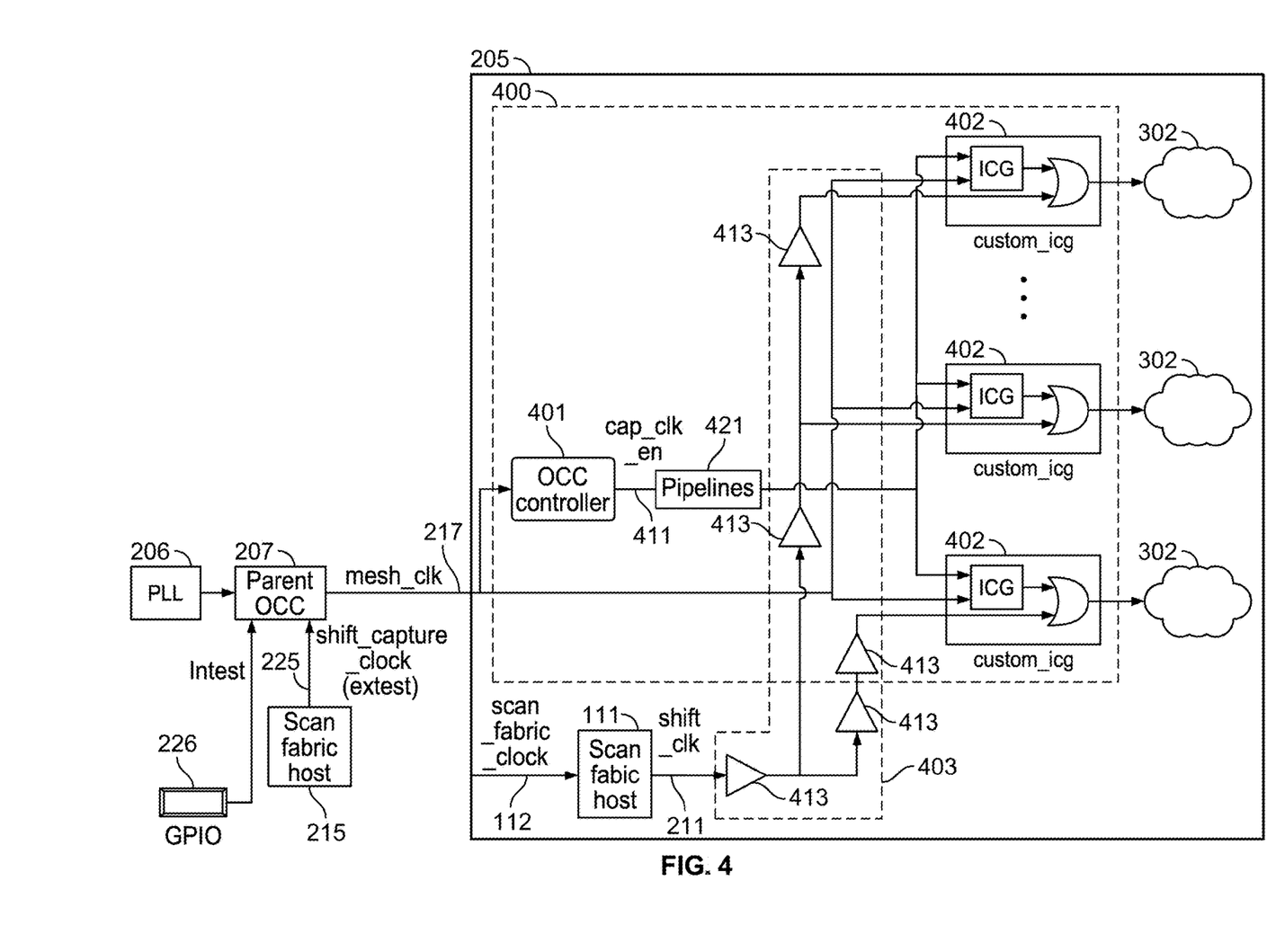
FIG. 4 is a schematic representation of a block in the mesh clock environment of FIGS. 2 and 3, incorporating implementations of the subject matter of this disclosure.
Figure 5:
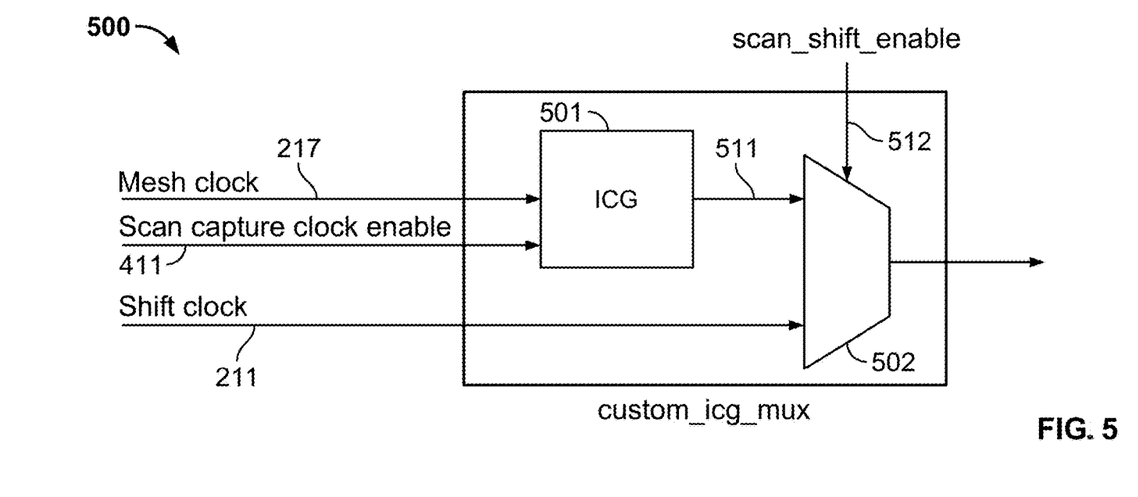
FIG. 5 is a schematic representation of a first alternative implementation of a specialized integrated clock gating cell in accordance with this disclosure.
Figure 6:
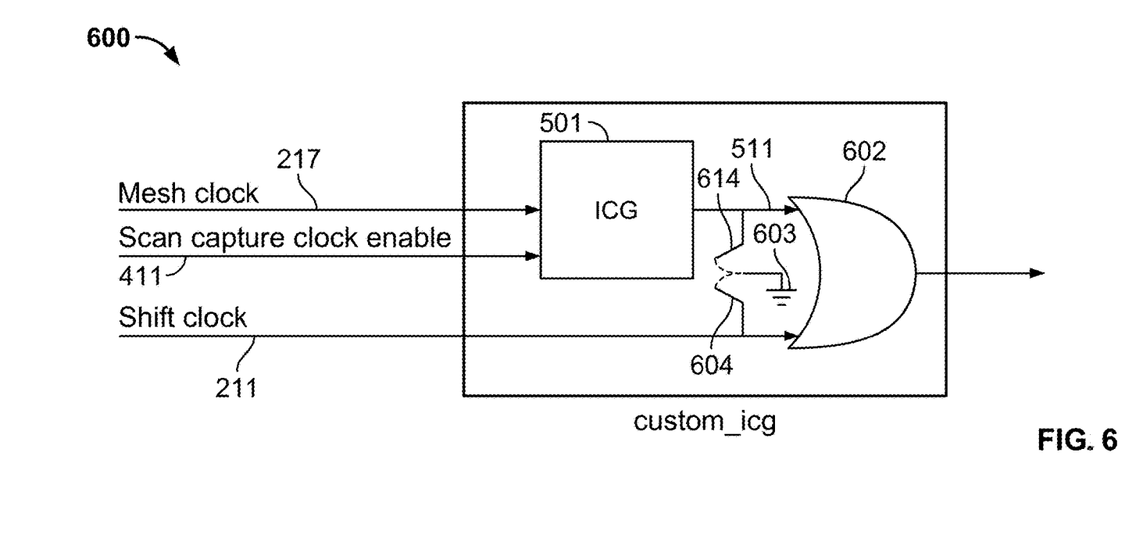
FIG. 6 is a schematic representation of a second alternative implementation of a specialized integrated clock gating cell in accordance with this disclosure.

Remote OCC 301 within each block 205 may have the structure 400 shown in FIG. 4, including an OCC controller 401 and a respective specialized, or custom, integrated clock gating cell (ICG) 402. OCC controller 401 generates a scan capture clock enable signal 411 from the output of parent OCC 207. Pipeline stages 421 can be used to control the phase of capture clock enable signal 411. A local scan fabric host 111 generates scan shift clock 211 from the scan fabric clock 112.

The output of parent OCC 207 may be the mesh clock, which also may be the stuck-at capture clock or the at-speed capture clock. In a first alternative, the output of parent OCC 207 may be derived from a shift capture clock 225 generated by a scan fabric host 215 of a different one of blocks 205, in an external test scenario. In a second alternative, the output of parent OCC 207 may be derived from a general-purpose input/output (GPIO) clock 226, which may be used as the capture clock in stuck-at capture testing. Each custom ICG 402 selects between a scan shift clock in a scan shift mode, and the capture clock in a scan capture mode.

Implementation 500 (FIG. 5) of custom ICG 402 may include an integrated clock gating cell 501 and a multiplexer 502. ICG cell 501 accepts the mesh clock 217 from parent OCC 207 and scan capture clock enable signal 411 from OCC controller 401, to generate a capture clock 511 in a scan capture mode. In scan capture mode, scan shift enable signal 512 is asserted with a value that causes multiplexer 502 to select capture clock 511. In scan shift mode, scan shift enable signal 512 is asserted with a value that causes multiplexer 502 to select scan shift clock 211.

Implementation 600 (FIG. 6) of custom ICG 402 may include an integrated clock gating cell 501 and an OR-gate 602. ICG cell 501 accepts the mesh clock signal 217 from parent OCC 207 and scan capture clock enable signal 411 from OCC controller 401, to generate a capture clock 511 in a scan capture mode. In scan capture mode, there is no scan shift clock 211, so OR-gate 602 passes capture clock 511; for certainty, the input of scan shift clock 211 to OR-gate 602 may be gated off at 604 to ground 603. In scan shift mode, there is no scan capture clock enable signal 411, and so there is no capture clock 511, so OR-gate 602 passes scan shift clock 211; for certainty, the input of capture clock 511 to OR-gate 602 may be gated off at 614 to ground 603.

As noted above, local scan fabric host 111 generates scan shift clock 211 from the scan fabric clock 112. Scan shift clock 211 is delivered to the custom ICGs 402 by a clock tree 403, which may be balanced to minimize skew among the various custom ICGs 402. For example, appropriate delays, such as buffers 413, may be provided in clock tree 403. Although beyond the scope of this disclosure, compensating delays may be provided at scan registers downstream of tap points 203.

By separating the scan clock distribution from the capture clock distribution, the structures described above allow for distribution of the capture clock via the same distribution network as the mesh clock, while any clock tree balancing needed for the scan clock is applied to the separate scan clock tree 403, without disturbing the mesh clock timing closure.

Figure 7:
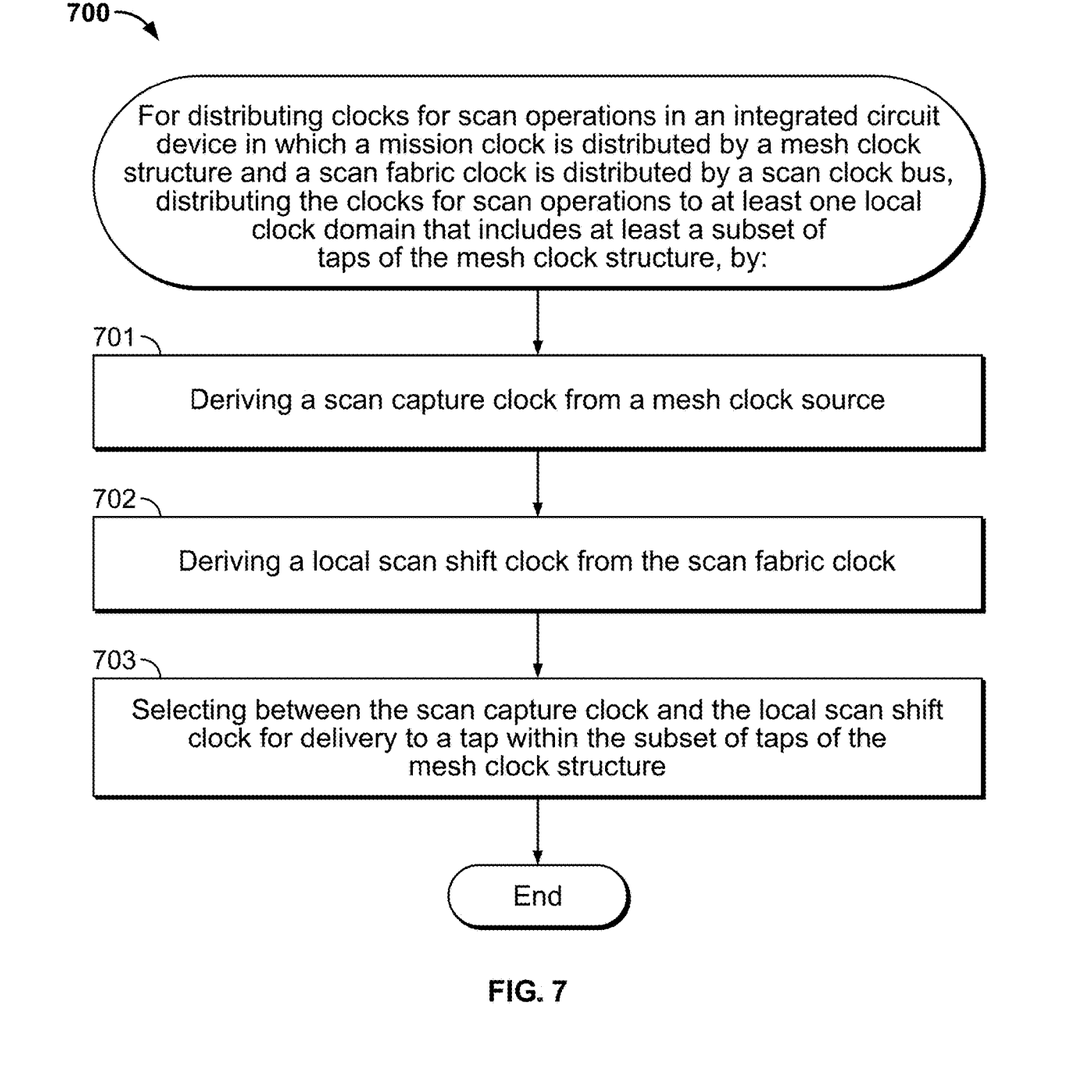
FIG. 7 is a flow diagram illustrating a method in accordance with implementations of the subject matter of this disclosure.

A method 700 according to implementations of the subject matter of this disclosure is diagrammed in FIG. 7. Method 700, for distributing clocks for scan operations in an integrated circuit device in which a mission mode clock is distributed by a mesh clock structure and a scan fabric clock is distributed by a scan clock bus, begins distributing the clocks for scan operations to at least one local clock domain that includes at least a subset of taps of the mesh clock structure, by, at 701, deriving a scan capture clock from a mesh clock source. At 702, a local scan shift clock is derived from the scan fabric clock. At 703, a selection is made between the scan capture clock and the local scan shift clock for delivery to a tap within the subset of taps of the mesh clock structure. Method 700 then ends.

Thus it is seen that an apparatus and method for balancing clock distribution, in a packetized scan chain testing fabric in a device in which clocks are distributed by a mesh clock network, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. Clock distribution circuitry for distributing clocks for scan operations in an integrated circuit device which a mission mode clock is distributed by a mesh clock structure and a scan fabric clock is distributed by a scan clock bus, the clock distribution circuitry comprising:
   a mesh clock source; and
   at least one local clock distribution structure configured to distribute the clocks for scan operations to a local clock domain that includes at least a subset of taps of the mesh clock structure, the local clock distribution structure including:
      a local clock controller configured to control derivation of a scan capture clock from the mesh clock source;
      a local scan host circuitry configured to derive a local scan shift clock from the scan fabric clock; and
      a plurality of specialized integrated clock gates corresponding in number to the subset of taps of the mesh clock structure, each specialized integrated clock gate within the plurality of specialized integrated clock gates being configured to select between the scan capture clock when the integrated circuit device is operating in a scan capture mode, and the local scan shift clock when the integrated circuit device is operating in a scan shift mode, for delivery to a tap within the subset of taps of the mesh clock structure.

2. The clock distribution circuitry of claim 1 wherein:
   the at least one local clock distribution structure configured to distribute the clocks for scan operations to the local clock domain that includes at least a subset of taps of the mesh clock structure comprises a plurality of local clock distribution structures; and
   each respective local clock distribution structure in the plurality of local clock distribution structures is configured to distribute the clocks for scan operations to a respective local clock domain that includes a respective subset of taps of the mesh clock structure.

3. The clock distribution circuitry of claim 1 wherein:
   the local clock controller is configured to derive a capture clock enable signal from output of the mesh clock source; and
   each specialized integrated clock gate within the plurality of specialized integrated clock gates comprises integrated clock gating circuitry configured to output the scan capture clock based on the capture clock enable signal and the output of the mesh clock source.

4. The clock distribution circuitry of claim 1 wherein each specialized integrated clock gate within the plurality of specialized integrated clock gates comprises a selection circuit configured to select between the scan capture clock and the local scan shift clock for delivery to the respective tap within the subset of taps of the mesh clock structure.

5. The clock distribution circuitry of claim 4 wherein the selection circuit comprises a multiplexer having a control input configured to control selection between the scan capture clock and the local scan shift clock for delivery to the respective tap within the subset of taps of the mesh clock structure.

6. The clock distribution circuitry of claim 4 wherein the selection circuit comprises an OR-gate having a first input coupled to the scan capture clock, a second input coupled to the local scan shift clock, and an output coupled to the respective tap within the subset of taps of the mesh clock structure.

7. The clock distribution circuitry of claim 6 wherein:
the first input of the OR-gate is selectably coupled to ground for selecting the local scan shift clock; and
the second input of the OR-gate is selectably coupled to ground for selecting the scan capture clock.

8. The clock distribution circuitry of claim 1 wherein the mesh clock source comprises:
clock control circuitry; and
at least one input clock source.

9. The clock distribution circuitry of claim 8 wherein the at least one input clock source comprises a phase locked loop for deriving an at-speed capture clock.

10. The clock distribution circuitry of claim 8 wherein the at least one input clock source comprises a general-purpose input/output clock of the integrated circuit device for use as a stuck-at capture clock.

11. The clock distribution circuitry of claim 8 wherein the at least one input clock source comprises an input for an external shift capture clock from another local clock domain of the integrated circuit device.

12. The clock distribution circuitry of claim 1 wherein the local clock distribution structure further includes a balanced clock tree for distribution of the local scan shift clock to each specialized integrated clock gate in the plurality of specialized integrated clock gates.

13. A clock distribution method for distributing clocks for scan operations in an integrated circuit device in which a mission mode clock is distributed by a mesh clock structure and a scan fabric clock is distributed by a scan clock bus, the clock distribution method comprising:
distributing the clocks for scan operations to at least one local clock domain that includes at least a subset of taps of the mesh clock structure, the distributing including:
deriving a scan capture clock from a mesh clock source;
deriving a local scan shift clock from the scan fabric clock; and
providing a plurality of specialized integrated clock gates corresponding in number to the subset of taps of the mesh clock structure; and using each specialized integrated clock gate within the plurality of specialized integrated clock gates, to select between the scan capture clock when the integrated circuit device is operating in a scan capture mode, and the local scan shift clock when the integrated circuit device is operating in a scan shift mode, for delivery to a tap within the subset of taps of the mesh clock structure.

14. The clock distribution method of claim 13 wherein distributing the clocks for scan operations to the at least one local clock domain comprises distributing the clocks for scan operations to a plurality of local clock domains, each local clock domain including a respective subset of taps of the mesh clock structure.

15. The clock distribution method of claim 13 wherein:
deriving of the scan capture clock from the mesh clock source comprises deriving a capture clock enable signal from output of the mesh clock source; and
outputting the scan capture clock based on the capture clock enable signal and the output of the mesh clock source.

16. The clock distribution method of claim 13 wherein selecting between the scan capture clock and the local scan shift clock for delivery to a tap within the subset of taps of the mesh clock structure comprises controlling a multiplexer control input to control selection between the scan capture clock and the local scan shift clock for delivery to the respective tap within the subset of taps of the mesh clock structure.

17. The clock distribution method of claim 13 wherein selecting between the scan capture clock and the local scan shift clock for delivery to a tap within the subset of taps of the mesh clock structure comprises coupling a first input of an OR-gate to the scan capture clock, coupling a second input of the OR-gate to the local scan shift clock, and coupling an output of the OR-gate to the respective tap within the subset of taps of the mesh clock structure.

18. The clock distribution method of claim 17 further comprising:
selectably coupling the first input of the OR-gate to ground for selecting the local scan shift clock; and
selectably coupling the second input of the OR-gate to ground for selecting the scan capture clock.

19. The clock distribution method of claim 13 wherein deriving the scan capture clock from the mesh clock source comprises deriving an at-speed capture clock from a phase-locked loop.

20. The clock distribution method of claim 13 wherein deriving the scan capture clock from the mesh clock source comprises inputting a general-purpose input/output of the integrated circuit device to the mesh clock source for use as a stuck-at capture clock.

21. The clock distribution method of claim 13 wherein deriving the scan capture clock from the mesh clock source comprises inputting an external shift capture clock from another local clock domain of the integrated circuit device to the mesh clock source for use as the scan capture clock.

* * * * *